(12) United States Patent  
Keener

(10) Patent No.: US 6,536,753 B1  
(45) Date of Patent: Mar. 25, 2003

(54) CUTTING BOARD HAVING A TROUGH

(76) Inventor: Kit L. Keener, 140 Cheeskogill Way, Loudon, TN (US) 37774

( * ) Notice: Subject to any disclaimer, the term of this patent is extended or adjusted under 35 U.S.C. 154(b) by 0 days.

(21) Appl. No.: 09/787,596

(22) PCT Filed: Nov. 2, 1999

(86) PCT No.: PCT/US99/25794

§ 371 (c)(1),
(2), (4) Date: Jun. 11, 2001

(87) PCT Pub. No.: WO00/27580

PCT Pub. Date: May 18, 2000

Related U.S. Application Data

(60) Provisional application No. 60/107,194, filed on Nov. 5, 1998.

(51) Int. Cl.[7] .................................................. B23Q 3/00
(52) U.S. Cl. ..................................... 269/13; 269/289 R
(58) Field of Search .................... 269/13, 15, 302.1, 269/289 R; 7/110, 170

(56) References Cited

U.S. PATENT DOCUMENTS

| 5,233,793 | A | * | 8/1993 | Dandurand | ..................... 7/110 |
| 5,527,022 | A | * | 6/1996 | Gibson | ................... 269/289 R |
| 5,860,641 | A | | 1/1999 | Heath | |
| 6,164,478 | A | * | 12/2000 | Cant | ...................... 269/289 R |

FOREIGN PATENT DOCUMENTS

FR      2343461      10/1977

* cited by examiner

*Primary Examiner*—Robert C. Watson
(74) *Attorney, Agent, or Firm*—Howard & Howard

(57) ABSTRACT

A cutting board assembly includes a generally horizontal board member having two generally longitudinal edges and opposing first and second transverse edges defining an upper cutting surface and a lower support surface. A support structure is attached to said lower surface forming an opening underneath the first transverse edge of the board member. The assembly further includes an integral or removable trough having a first end disposed within the opening and an opposing second end extending outwardly beyond the first transverse edge of the board member.

15 Claims, 2 Drawing Sheets

CUTTING BOARD HAVING A TROUGH

This application claims benefits of provisional application Ser. No. 60/107,194 filed Nov. 5, 1998.

BACKGROUND OF THE INVENTION

This application relates to an improved cutting board preferably having a measuring reservoir or removable trough.

Prior art cutting boards have included an opening or an elongated slot positioned above a receptacle or reservoir for collecting pieces of food and/or fluids produced during a carving or cutting operation. Unfortunately, these prior art cutting boards have several shortcomings. For example, the opening in the cutting board is difficult to clean, reduces the useful work surface of the cutting board, and limits the size of food pieces which may be passed through to the receptacle. Depending upon the purpose of the cutting operation, the cut material must be removed from the trough for measurement or the board must be tipped to remove waste. Further, the receptacle is often difficult to remove from the cutting board. Accordingly, there is a desire to provide an improved cutting board preferably having a removable measuring reservoir trough which overcomes the shortcomings of the prior art.

SUMMARY OF THE INVENTION

In a disclosed first embodiment of this invention, a cutting board assembly includes a generally horizontal board member having two generally longitudinal edges and opposing first and second transverse edges defining an upper cutting surface and a lower support surface. A support structure is attached to said lower surface forming an opening underneath the first transverse edge of the board member. The assembly further includes an integral or removable trough having a first end disposed within the opening and an opposing second end extending outwardly beyond the first transverse edge of the board member.

Preferably, the trough has a cup-shaped body. Where the trough is removable, the trough includes first and second fences, first and second ramp portions, and a handle. The cup-shaped body of the removable trough has a pouring lip disposed at the first end of the trough and a base wall disposed at the second end of the trough. The first fence extends from one end of the base wall to the adjacent end of the first transverse edge of the board member. The second fence extends from the other end of the base wall to the opposite end of the first transverse edge of the board member. The first ramp portion is disposed between the first fence, the first transverse edge of the board member, and the cup-shaped body. The second ramp portion is disposed between the second fence, the first transverse edge of the board member. and the cup-shaped body. The handle projects out of the base wall away from the first transverse edge of the board member.

In a disclosed second integral embodiment of the invention. the cutting board assembly includes a generally horizontal board member having two longitudinal edges and an upper cutting surface, an opening adjacent a transverse edge, and an integral trough portion extending outwardly away from the opposed transverse edge of the board member. Preferably, the trough includes a cup-shaped body having a pouring lip disposed at the end of the trough away from the first transverse edge of the board member. In the preferred embodiment, the inclined wall includes volume indicating indicia. The cutting board is preferably oval shaped having arcuate longitudinal side portions. An upstanding lip extends along one longitudinal side and a drainage groove extends along the opposed side. A knife sharpening groove is provided in the lip.

These and other features of the present invention will be best understood from the following specification and drawings, the following of which is a brief description.

DETAILED DESCRIPTION OF THE PREFERRED EMBODIMENT

Figure 1:
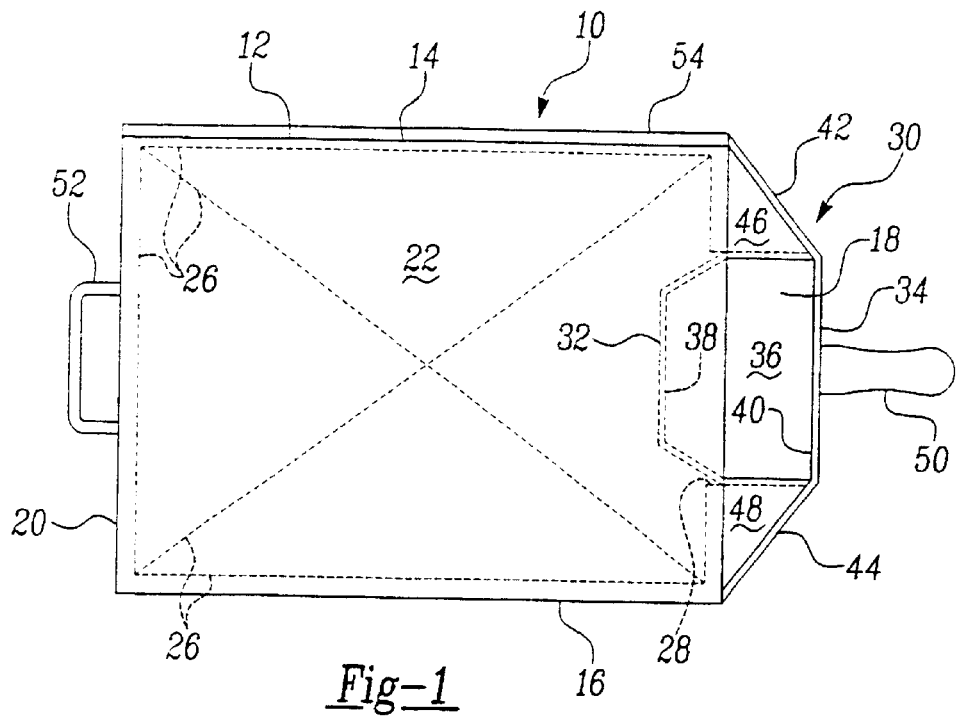
FIG. 1 is a top view of a first embodiment of a cutting board assembly in accordance with the present invention.
Figure 2:
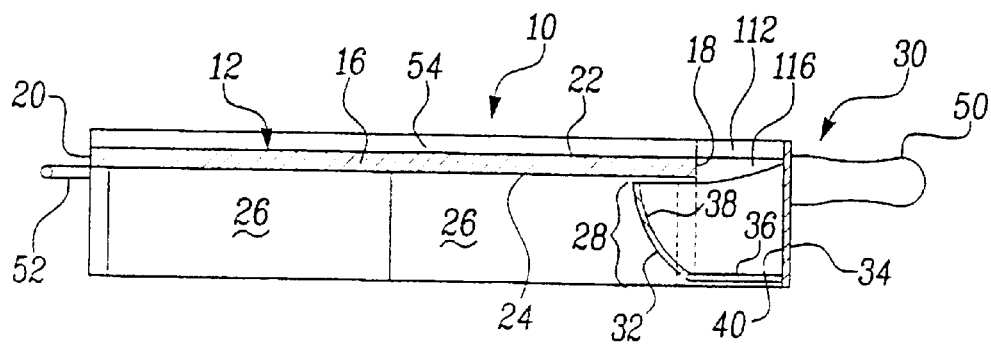
FIG. 2 is cross-sectional side view of the first embodiment cutting board assembly.
Figure 3:
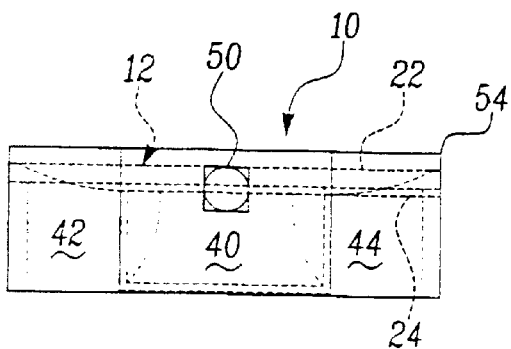
FIG. 3 is an end view of the first embodiment cutting board assembly.

Referring to the Figures, wherein like numerals indicate like or corresponding parts throughout the several views, a first embodiment of a cutting board assembly 10 in accordance with the present invention is shown in FIGS. 1–3. The cutting board assembly 10 includes a generally horizontal board member 12 having opposed upstanding generally longitudinal lips or edges 14 and 16 and opposing first and second transverse edges 18 and 20 defining an upper cutting surface 22 and a lower support surface 24. Preferably, the board member 12 has a slight downward incline such that any juices or liquids produced during a carving or cutting operation tend to flow from the second edge 20 toward the first edge 18. If desired. the board member 12 may further include a drainage groove, preferably disposed along the lateral edge 14, for directing juices toward the first edge 18.

A support structure 26 is attached or integral with to the lower support surface 24 forming an opening 28 underneath the first edge 18 of the board member 12. The support structure 26 is designed to provide a stable foundation for the board member 12 when the cutting board assembly 10 is placed on a planar surface, such as a counter.

The cutting board assembly 10 further includes a removable trough or scoop 30 having a first end, generally indicated by 32, disposed within the opening 28 and an opposing second end, generally indicated by 34, extending outwardly beyond the first edge 18 of the board member 12.

The trough 30 includes a cup-shaped body 36 having a pouring lip 38 disposed at the first end 32 of the trough 30 and a base wall 40 disposed at the second end 34 of the trough 30. A first fence 42 extends from one end of the base wall 40 to the adjacent end of the first edge 18 of the board member 12. A second fence 44 extends from the other end of the base wall 40 to the opposite end of the first edge 18 of the board member 12. A first ramp portion 46 is disposed between the first fence 42, the first edge 18 of the board member 12, and the cup-shaped body 36. A second ramp portion 48 is disposed between the second fence 44, the first edge 18 of the board member 12, and the cup-shaped body 36. A handle 50 projects out of the base wall 34 away from the first edge 18 of the board member 12.

The trough 30 is adapted to receive and contain food, such as cut pieces of vegetables or meats, and fluids produced during the cutting or carving of such food. The first and second fences 42 and 44 are designed to prevent food and fluids from spilling off end the cutting board assembly 10. The first and second ramp portions 46 and 48 are adapted to direct food and fluids into the cup-shaped body 36 of the trough 30. In this manner, an operator can scrap food and fluids over the first edge 18 into the cup-shaped body 36 of the trough 30. When desired, the trough 30 may be removed by the handle 50 from the cutting board assembly 10 and the contents of the trough 30 may be poured elsewhere.

A grip or handle 52 is attached to the assembly 10 adjacent to the second edge 20 of the board member 12. The operator can use the grip 52 when carving on the cutting board assembly 10 or moving the cutting board assembly 10. A retaining wall 54 is attached along the longitudinal edge 14 of the board member 12. The upstanding lip 54 is adapted to prevent food and fluids from spilling over the longitudinal edge 14 of the board member 12. Alternatively, the retaining wall 54 could be attached along the longitudinal edge 16 of the board member 12 to better facilitate use of the cutting board assembly 10 by a left handed operator.

The first embodiment assembly 10 may be formed of various materials including wood or plastic, but is preferably formed injection molded food-grade plastic which is anti-bacterial and sterilizable.

Figure 4:
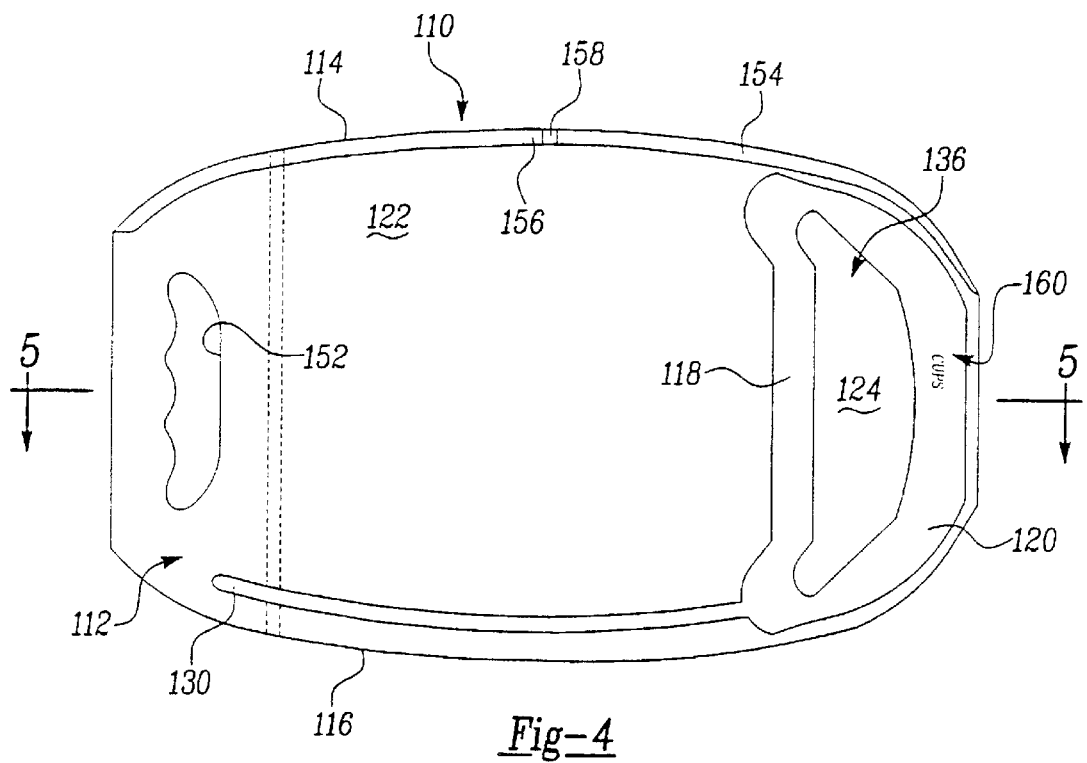
FIG. 4 is a top view of a second integral embodiment of a cutting board assembly in accordance with the present invention.
Figure 5:
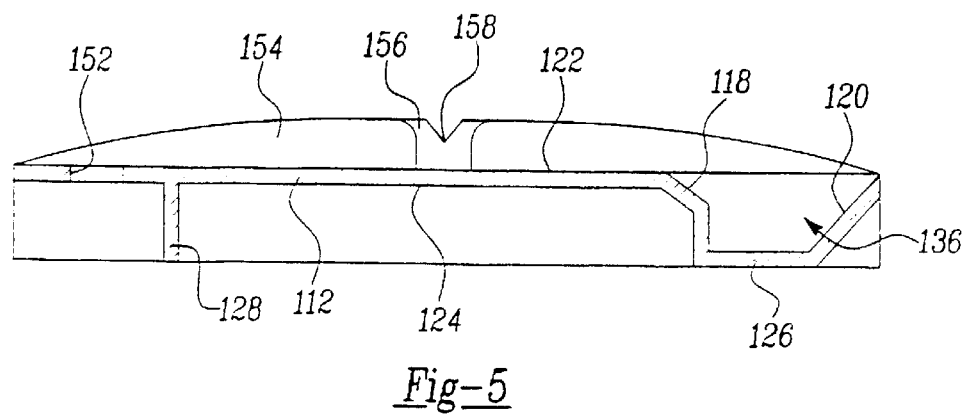
FIG. 5 is cross-sectional side view of the second integral embodiment cutting board assembly

The present invention also includes a second embodiment of a cutting board assembly 110 as shown in FIGS. 4 and 5, wherein like numerals are increased by multiples of 100 to indicate like or corresponding parts. The single-piece cutting board assembly 110 includes a generally horizontal board member 112 having two generally longitudinal edges 114 and 116 defining an upper cutting surface 122. Preferably, the board member 112 has downwardly inclined surfaces 118 and 120 adjacent the reservoir 136 such that any juices or liquids produced during a carving or cutting operation tend to flow to the reservoir. The board member 112 further includes a drainage groove 130, preferably disposed along the lateral edge 116, for directing juices toward the reservoir 136. In this embodiment, the reservoir 136 is integral with the cutting board 112 and further includes a bottom wall 124.

Preferably, the board member 112 includes a lower surface 124 and an integral support structure 128 which in combination with the bottom wall 126 of the trough provides a stable foundation for the board member 112 when the cutting board assembly 110 is placed on a planar surface, such as a counter. An opening 152 in the board member 112 provides an integral handle for the cutting board. The operator can grip the board through the opening 152 when carving on the cutting board assembly 110 or moving the cutting board assembly 110.

The cutting board 112 preferably includes an integral upstanding lip 154 which extends along longitudinal edge 114 as best shown in FIG. 4. In the preferred embodiment of the integral cutting board assembly 110, the general longitudinal edges 114 and 116 are arcuate as shown in FIG. 4, such that the lip 154 and drainage groove 130 direct material and fluids toward the trough 136. Further, in the disclosed embodiment, lip 154 includes an insert 156 having a V-shaped groove 158 lined with an abrasive material, such as carbide or ceramic, for sharpening knives. Another feature of the improved integral cutting board of this invention is the inclined surface 120 of the trough includes indicia 160 which indicates the volume of material in the trough, such as cups.

The second embodiment of the cutting board assembly 110 may be formed of various materials including wood or plastic. but is preferably formed injection molded food-grade plastic which is antibacterial and sterilizable.

Preferred embodiments of this invention have been disclosed, however, a worker of ordinary skill in the all would recognize that certain modifications would come within the scope of this invention. For that reason, the following claims should be studied to determine the true scope and content of this invention.

What is claimed is:

1. A cutting board assembly comprising:
   a generally horizontal cutting board having generally longitudinal and transverse edges defining a cutting surface;
   a support structure formed from a wall extending downwardly from said cutting board defining an opening beneath cutting board; and
   a trough having a bottom and opposed side surfaces adjacent one of said transverse edges of said cutting board for receiving material from said cutting surface; and
   an upstanding lip extending along one of said longitudinal edges directing material toward said trough.

2. The cutting board assembly defined in claim 1, wherein said cutting surface adjacent the longitudinal edge opposite said one of said longitudinal edges includes a drainage groove.

3. The cutting board assembly defined in claim 1, wherein said cutting board includes a surface inclined toward said trough.

4. The cutting board assembly defined in claim 1, wherein said trough is removable and separate from said cutting board and said side wall of said trough is received beneath said one of said transverse edges of said cutting board.

5. The cutting board assembly defined in claim 4, wherein said trough includes a handle and an opposed pouring lip.

6. The cutting board assembly defined in claim 1, wherein one of said side walls of said trough is inclined and includes spaced indicia indicating the volume of said material in said trough.

7. The cutting board assembly defined in claim 1, wherein said upstanding lip includes a V-shaped slot having abrasive material for sharpening a knife.

8. The cutting board assembly defined in claim 1, wherein said trough is integral with said cutting board and said side walls are inclined toward said bottom wall of said trough.

9. A cutting board assembly comprising:
   a generally horizontal board member having two longitudinal edges and opposing first and second transverse edges defining an upper cutting surface and a lower support surface;
   a support structure formed from a wall extending downwardly from said lower support surface forming an opening underneath said first transverse edge of said board member; and
   a removable trough having a first end disposed within said opening and an opposing second end extending outwardly beyond said first transverse edge of said board member.

10. An assembly as set forth in claim 9 wherein said trough includes a cup-shaped body having a pouring lip disposed at said first end of said trough and a base wall disposed at said second end of said trough.

11. An assembly as set forth in claim 10 wherein said trough includes a first fence extending from one end of said base wall to the adjacent end of said first transverse edge of said board member, a second fence extending from the other end of said base wall to the opposite end of said first transverse edge of said board member. a first ramp portion disposed between said first fence, said first transverse edge of said board member, and said cup-shaped body, and a second ramp portion disposed between said second fence, said first transverse edge of said board member, and said cup-shaped body.

12. An assembly as set forth in claim 11 wherein said trough includes a handle projecting out of said base wall away from said first transverse edge of said board member.

13. An assembly as set forth in claim 9 including a grip attached to said assembly adjacent said second transverse edge of said board member.

14. An assembly as set forth in claim 9 including a retaining wall attached along one of said longitudinal edges.

15. A cutting board assembly comprising:

a generally horizontal board member having two longitudinal edges and opposing first and second transverse edges defining an upper cutting surface and a lower support surface;

a support structure formed from a wall extending downwardly from said lower support surface forming an opening underneath said first transverse edge of said board member; and a removable trough having a first end disposed within said opening and an opposing second end extending outwardly beyond said first transverse edge of said board member; and a cup-shaped body disposed on said trough and having a pouring lip disposed at said first end of said trough and a base wall disposed at said second end of said trough;

wherein said trough includes a first fence extending from one end of said base wall to the adjacent end of said first transverse edge of said board member, a second fence extending from the other end of said base wall to the opposite end of said first transverse edge of said board member, a first ramp portion disposed between said first fence, said first transverse edge of said board member, and said cup-shaped body, a second ramp portion disposed between said second fence, said first transverse edge of said board member, and said cup-shaped body.

* * * * *